Figure 1:
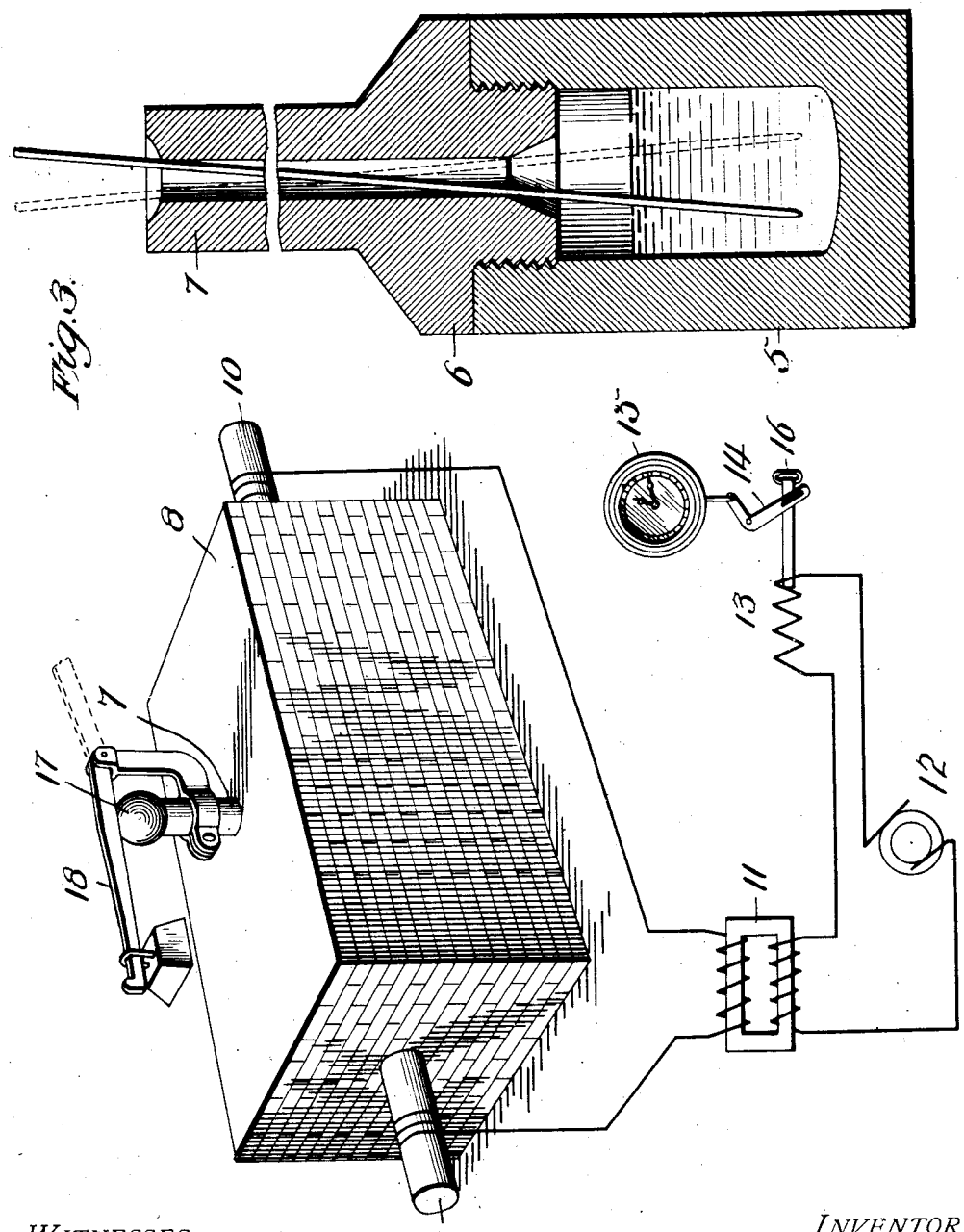

No. 869,114. PATENTED OCT. 22, 1907.
S. A. TUCKER.
MASSIVE BORON CARBID AND PROCESS OF MAKING SAME.
APPLICATION FILED DEC. 19, 1906.

2 SHEETS—SHEET 1.

WITNESSES:
INVENTOR
Samuel A. Tucker
BY Buckingham & Ewart
Attorneys

No. 869,114. PATENTED OCT. 22, 1907.
S. A. TUCKER.
MASSIVE BORON CARBID AND PROCESS OF MAKING SAME.
APPLICATION FILED DEC. 19, 1906.

2 SHEETS—SHEET 2.

WITNESSES
INVENTOR
Samuel A. Tucker
By Buckingham & Ewart
Attorneys

UNITED STATES PATENT OFFICE.

SAMUEL A. TUCKER, OF NEW YORK, N. Y., ASSIGNOR TO ELMER A. SPERRY, OF NEW YORK, N. Y.

MASSIVE BORON CARBID AND PROCESS OF MAKING SAME.

No. 869,114.   Specification of Letters Patent.   Patented Oct. 22, 1907.

Application filed December 19, 1906. Serial No. 348,607.

*To all whom it may concern:*

Be it known that I, SAMUEL A. TUCKER, a citizen of the United States, residing at New York, in the county of New York and State of New York, have invented new and useful Improvements in Massive Boron Carbid and Processes of Making Same, of which the following is a specification.

The object of my invention is the commercial production of pure or practically pure boron carbid—$B_6C$, manufacturing it from commercial and comparatively inexpensive compounds of boron and producing it directly in the electric furnace,—that is,—avoiding the expensive process of separating it from metals or other bodies in which it is suspended or with which it is intimately associated, as has been the practice heretofore with the minute quantities that have been produced. Furthermore, to produce this product in a more available form as to physical character, meaning by this as a ponderable mass or masses instead of a fine dust or impalpable powder found upon microscopic examination to consist of minute crystals. My new massive boron carbid has a specific gravity of about 2.7.

Previous methods employing a boron compound have found it necessary to associate the compound with other bodies in which the product is dissolved,—see Moissan's solution of boron and carbon in certain metals at electric furnace temperatures, this having been recommended by him as the most suitable method for its preparation. Or again, where the carbid becomes intimately associated with the foreign bodies,—see Moissan's silicate of alumina and boric acid reaction where the product is intimately associated with silicon carbid. Where the carbid is dissolved in metals, laborious and expensive solutions of the metals are necessary to reclaim the little powdered carbid, which even then is so intimately mixed with graphite as to blacken the fingers. Joly and Mühlhäuser produce a mixture of bodies, the latter failing to identify the carbid as such, denominating the product as "a borid of carbon—$BC$."

The dust-like powder resulting from reactions with amorphus boron and carbon form no part of the present invention.

The pure boron carbid produced by the present process has many uses in the arts. It is available as a highly refractory material, it being an electrical conductor; from it, incandescent filaments and high temperature resistors and electrical conductors generally, may be made. Such conductors are found not to be attacked at temperatures of the order of the arc. The material being an electric conductor, as stated, is, therefore, available for arc terminals and also for electrolytic uses. Boron carbid is also extremely hard, being definitely harder than corundum or carborundum, easily scratching or reducing either, having been used to produce facets upon diamonds. This hardness would be of very little value, were it not for the entirely new form in which the substance is produced by my process, namely, in the massive state, for in this form it has no definite unit quantity or shape, as for instance, the plate crystals of carborundum, nor is it brittle or fragile, as is this crystal; at the same time, it is definitely harder. Pieces of this substance are, therefore, available for a large number of uses; for instance, they have been set in place of bortz, carbons and diamonds in the diamond drill; they have been used for stone dressing and as glass cutters; also for dressing emery and carborundum wheels. Pieces of this substance have been drilled for use as dies in place of carbons and diamonds for wire drawing. $B_6C$ may also be used as an "alloy" for commingling with metals for producing changed or altered characteristics in such metals. It will also be readily understood that the physical structure and the fact that I may produce the product in the massive form has a very pronounced bearing on many other of its uses, for instance, its use as an electrical conductor and as an electrode for electrolytic work, as stated.

Figure 2:
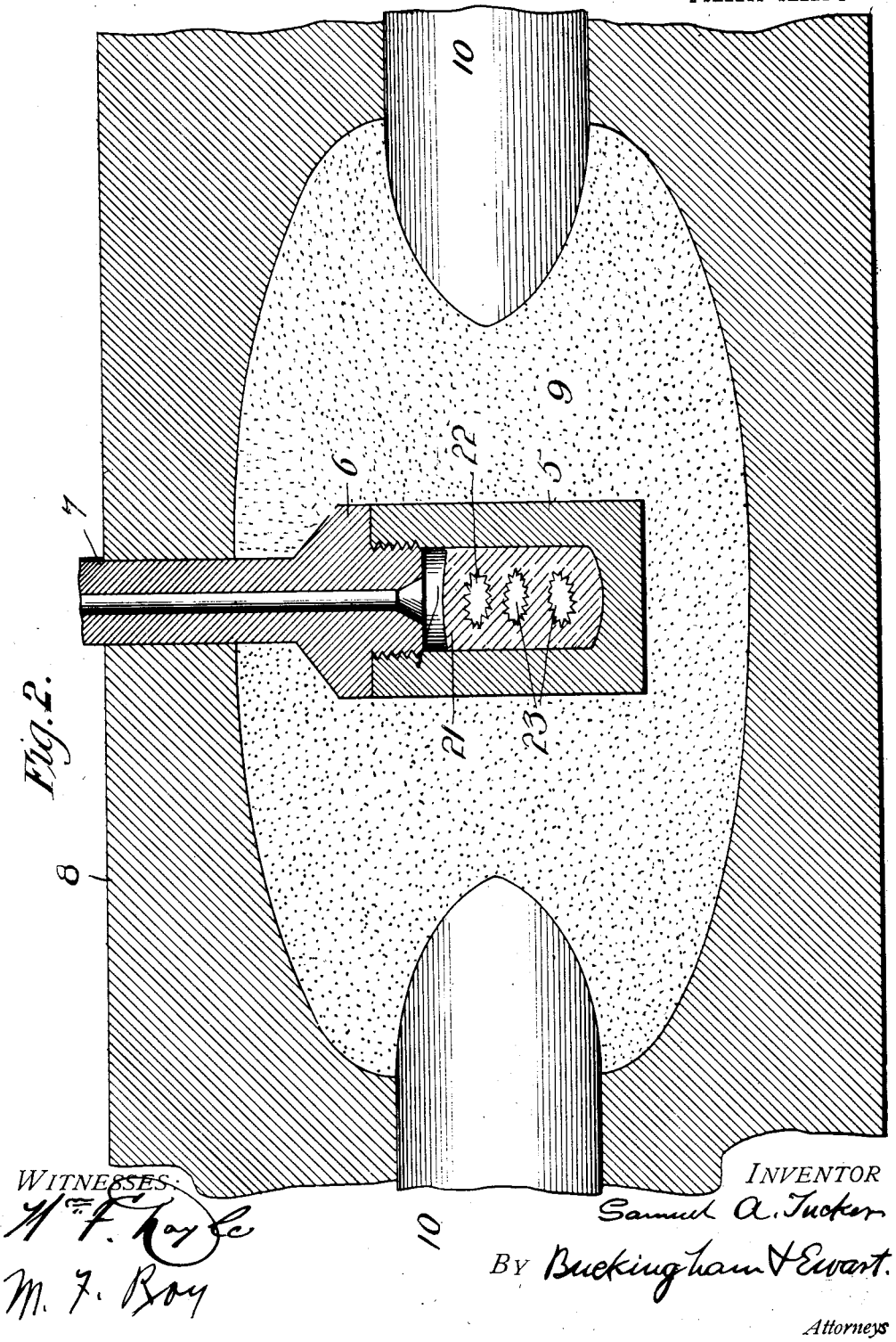

As illustrating one method of its preparation, reference is hereby made to the accompanying drawings forming a part hereof, in which similar reference characters indicate like parts throughout, and in which:

Figure 1 represents a more or less diagrammatic view of one form of a resistance furnace, and electric apparatus connected therewith. Fig. 2 shows a vertical section of such furnace and one form of reaction chamber, also a section through one form of the finished product within the chamber. Fig. 3 illustrates the position of the parts while stirring.

The material consisting for instance of carbon and anhydrous boron oxid ($B_2O_3$) preferably well comingled in predetermined proportions as to the boron and carbon constituents, is placed within any form of suitable inclosure, as for instance the chamber 5 made of refractory substance, such for instance as pure graphite and preferably capable of sustaining a pressure without undue leakage, being closed by cap 6, which may, be supplied with an upwardly extending stem or tube 7. This cell or inclosure is placed within a cavity in an electric furnace 8, and packed with electric conducting, but resisting material, such as carbon or boron carbid particles 9. The terminals 10, 10, lead to the secondary of the transformer 11 supplied from an alternating current source 12, in the current of which is a regulator, or reactance coil, 13, the core of which is operated by the lever 14, actuated by any suitable automatic device, as for instance, the clock-work 15, or may be operated by handle 16.

Means are provided whereby the contents of the chamber 5 may be brought under suitable pressure during the reaction or other period, and to this end the upper end of the tube 7 is provided with a suitable closure or valve illustrated by the ball 17 held in place by lever and weight 18 which are capable of being thrown back out of position, as is shown in Fig. 3, whereby a rod 19 or other suitable stirrer, may be introduced and operated.

It is found for some purposes preferable to mix the ingredients in such proportions that the boron compound is present somewhat in excess. The process involving the use of excess of the boron element is found advantageous in yielding a purer product, and one freer from admixed graphite and other impurities, and also aiding to yield massive boron carbid, which is a form herein pointed out for the first time.

It will be readily understood that other means can be employed, such for instance as a pump for placing the contents of chamber 5 under pressure and for controlling the pressures within such chamber.

Having thus described one form of the apparatus, the method of operation will be obvious from the foregoing. The mixture having been placed in the chamber 5, the heat is brought to a point where the boron oxid melts into a glassy and somewhat viscous mass 20. At this point in the operation it may be desirable that the materials be stirred, which may be accomplished in any suitable manner, for instance the furnace as a whole may be moved or the inclosure 5 itself may be moved in the loose resisting material 9, or the contents may be directly stirred, as shown in Fig. 3, during which time the temperature may be raised to the point where the reaction takes place. It may be stated of this reaction that it is perfectly definite and with proper temperature very vigorous, the gases coming from the chamber in considerable volume easily serving through the adjustable ball-valve mechanism 17 and 18 to control the pressures within the chamber.

I find that the temperature and its distribution is important and for some purposes it is desirable that the chamber 5 or its equivalent be somewhat elongated and that it be subjected to a non-uniform temperature so that in this manner upon removal of the product it may be segregated into masses produced at critical temperatures. I have discovered that in this way carbid possessing peculiar physical characteristics may be obtained and separated from that which possesses other characteristics or forms. In this manner I have produced ponderable masses of practically pure carbid having a metal-like fracture of considerable density and great mechanical strength, this I denominate massive boron carbid. In the same compartment, for instance, 21, Fig. 2, I have produced crystals as 22, but I find these usually exist in this combination around cavities as 23, opening up in the mass upon cooling. I have made the discovery that crystals, regardless of their exact method of production are larger with a definite tendency to freedom from fracture and more valuable when the cooling takes place slowly. I have provided as one means of producing slow cooling, the current regulating mechanism 13, 14, 15, and 16, which may be actuated automatically to perform this function.

The ponderable masses having a metal-like fracture which are herein described for the first time and consist of practically pure $B_6C$ may be known as massive boron carbid.

My process is not limited to the steps or features in the order named, nor to the apparatus or materials described herein, nor in any particular other than is set forth in the accompanying claims taken in connection with the specification.

I claim:

1. The process which consists in bringing a boron compound and carbon to the reacting temperature under conditions which produce practically pure boron carbid.

2. The process which consists in bringing a boron oxid and carbon to the reacting temperature under conditions which produce practically pure boron carbid.

3. The process which consists in bringing carbon and a boron compound in excess to the reacting temperature under conditions which produce practically pure boron carbid.

4. The process which consists in bringing a boron compound and carbon to the reacting temperature under conditions which produce practically pure boron carbid and then cooling the product slowly.

5. The process which consists in bringing a boron compound and carbon to a non-uniform but reacting temperature under conditions which eliminate foreign bodies from the carbid produced and separating the reaction products of the different temperatures.

6. The process which consists in bringing a boron compound and carbon to the reacting temperature under conditions of temperature control and which also produce practically pure boron carbid.

7. The process which consists in bringing a boron compound and carbon to the reacting temperature under conditions which produce practically pure boron carbid, cooling the outer layers and allowing contraction to open up caverns within the mass, aiding thereby in producing carbid of different physical characteristics and afterwards separating same.

8. The method of producing practically pure boron carbid which consists in bringing a boron compound and carbon in an inclosure to the requisite temperature to produce the reaction and controlling the pressure within the inclosure.

9. As a new article of manufacture a mass having a metal-like fracture and a specific gravity of approximately 2.7 consisting of practically pure boron carbid.

10. As a new article of manufacture boron carbid having a composition substantially $B_6C$.

In testimony whereof I have hereunto set my hand in presence of two subscribing witnesses.

SAMUEL A. TUCKER.

Witnesses:
C. ALEX. NELSON,
FREDERIC W. ERB.